July 25, 1967

J. GRUNFELDER 3,332,705

HANDLING TRUCK

Filed May 6, 1965

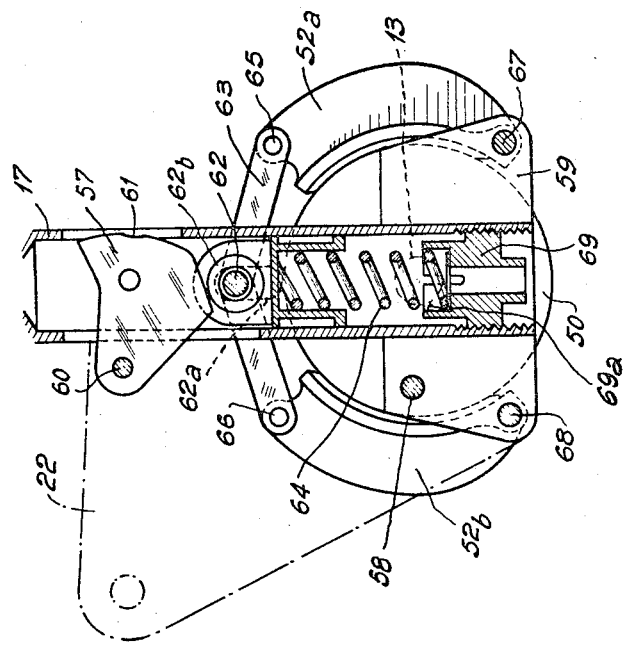
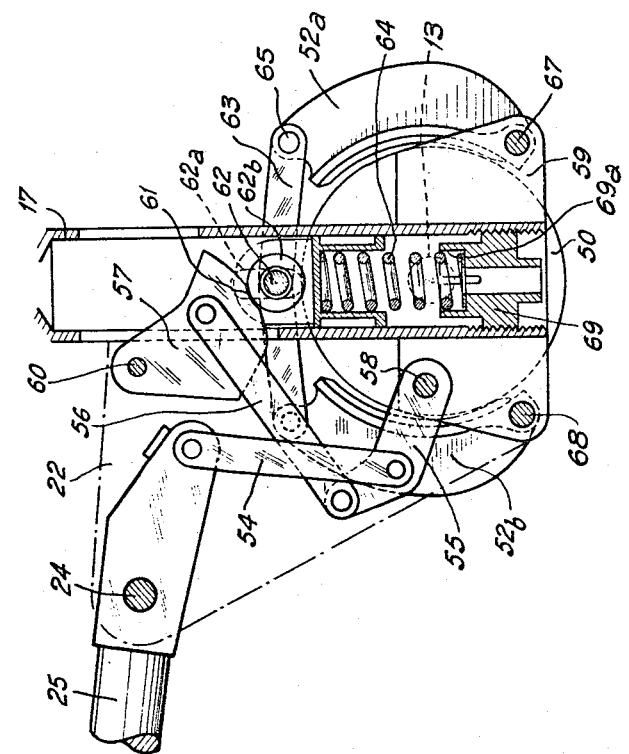

July 25, 1967  J. GRUNFELDER  3,332,705
HANDLING TRUCK
Filed May 6, 1965  5 Sheets-Sheet 5
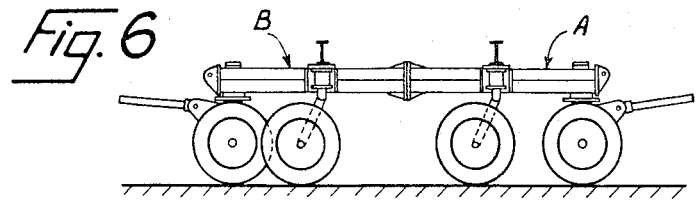
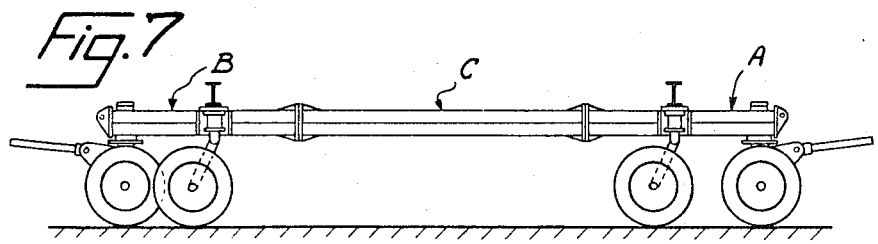
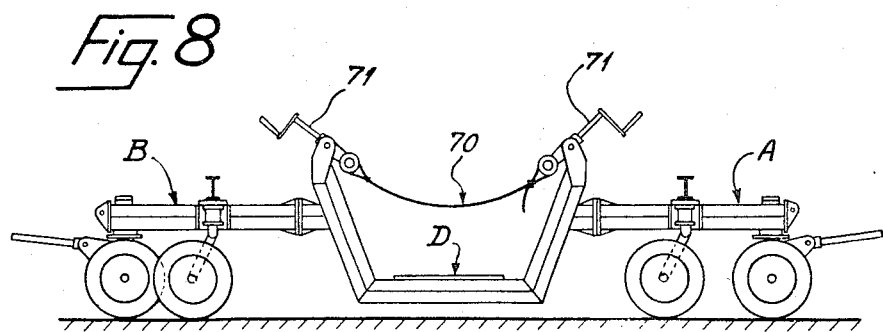
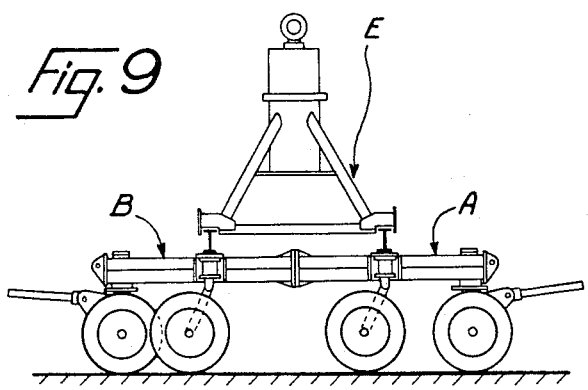

3,332,705
HANDLING TRUCK
Jean Grunfelder, Paris, France, assignor to Sud-Aviation, Societe Nationale de Constructions Aeronautiques, Paris, France, a corporation of France
Filed May 6, 1965, Ser. No. 453,648
Claims priority, application France, May 13, 1964, 974,361
5 Claims. (Cl. 280—408)

Many handling trucks are already known which have variable numbers and arrangements of wheels.

Some of these trucks, comprising a plurality of self-directing pivoting wheels of the type known as casters, can be moved in an arbitrary direction provided that the majority of their wheels are initially directed at least substantially in the chosen direction and that the ground over which they roll is firm.

Other trucks comprise, associated with fixed wheels, wheels which can be selectively directed. Such wheels are connected for example by an axle fast with a draw bar and can pivot about an axis situated in the middle of the axle. Such trucks are maneuverable but they cannot be moved in an arbitrary direction.

The present invention overcomes these disadvantages. According to the invention, the handling truck is characterised in that it comprises at two opposite ends an optionally directable running gear unit of narrow track width relatively to the width of the truck, the said running gear units being each mobile about a king-pin, and, at either side of the plane defined by the said king-pins, a plurality of self-directing running gear units.

In order to facilitate the directing of the selectively directable running gear units in the stationary state, these units advantageously comprise two wheels mounted close together on co-axial stub shafts.

Each self-directing running gear unit comprises preferably a single offset wheel which facilitates the spontaneous direction of this unit when movement takes place.

All the running gear units are advantageously equipped with tyres. Directing means may comprise a lever fast with each of the selectively directable running gear units. This lever is advantageously mounted to be pivotable about an axis parallel to that of the wheels.

The rotation of the lever about this axis may control a brake device acting preferably in the sense of lowering the lever. A draw bar may be fitted to this lever so as to make it possible to draw the truck by means of a vehicle. Draw bars of different lengths may be provided for permitting the conveyance of articles of large sizes.

For this purpose the truck according to the invention may moreover be composed of two identical elements which can be connected in a plane perpendicular to the plane defined by the king-pins, either directly or by means of extensions of various forms appropriate to the article being transported.

The sides of the truck advantageously comprise fixing straps which can fit fixed supports, for example trestles, so as to facilitate the transfer of the load being transported from these fixed supports to the truck and vice versa.

In order to counteract the risk of the tyres on the running gear units from being crushed under heavy loads and in order to permit of adjusting the height of the truck to the height of the fixed supports, supporting legs comprising screw jacks for example are placed at each side of the truck. These supporting legs are advantageously adapted to be folded below the truck during movement.

Advantageously, each of the identical elements of the truck is formed by a central beam carrying at one of its ends the selectively directable running gear unit and at its other end a connecting flange. Articulated by means of a pivot to this central beam is at least one cross-beam on the ends of which there are mounted the self-directing running gear unit, the said cross-beam being adapted to fold along the said central beam and to be held in this position by the supporting legs used horizontally.

Rapid locking means permit the position of the cross-beams to be fixed relatively to the position of the central beam.

The invention is illustrated by way of example in the accompanying drawings, in which:

FIGURE 1a shows in perspective the handling truck according to the invention.

FIGURE 1b shows an example of a draw bar which can fit the truck shown in FIGURE 1a.

FIGURE 4 shows the truck braking device in the non-active position and FIGURE 5 is a partial view of this device in the active position.

FIGURES 6, 7, 8 and 9 show some examples of using the truck according to the invention.

Figure 1:
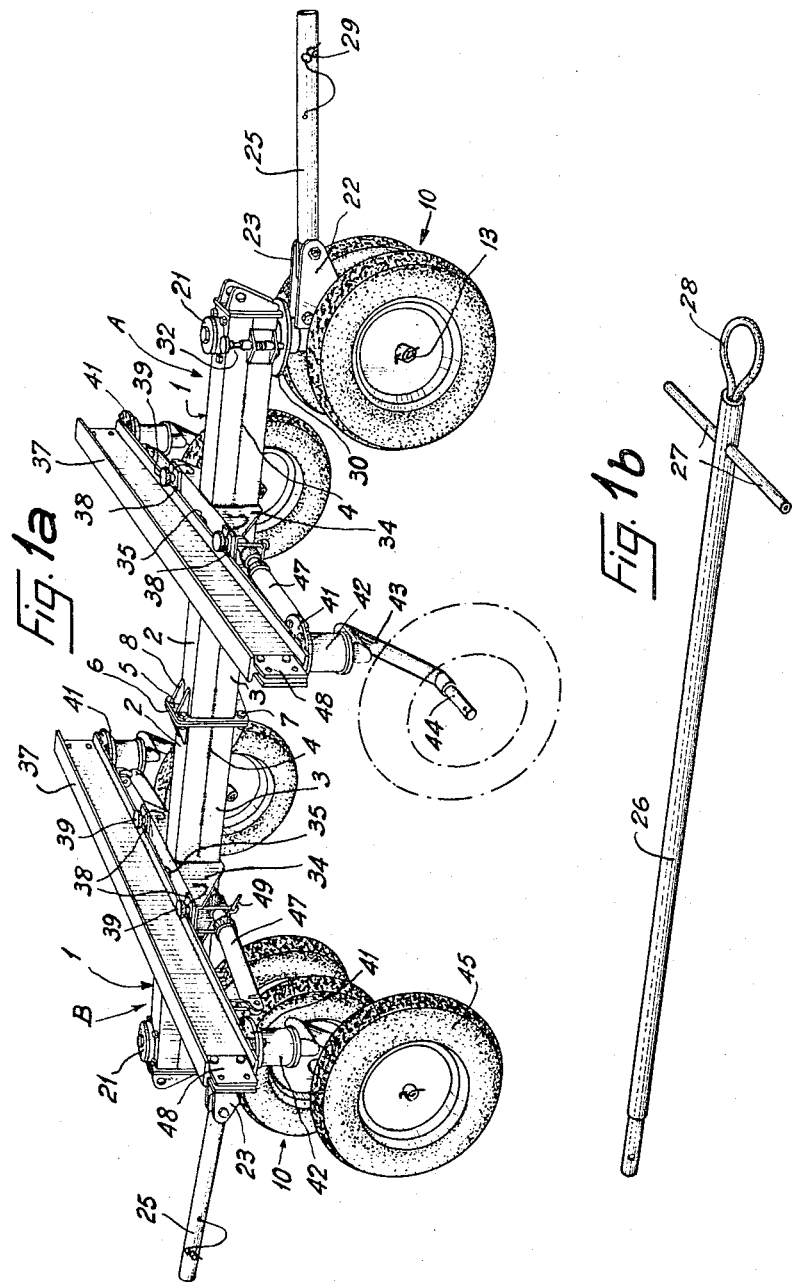
Figure 2:
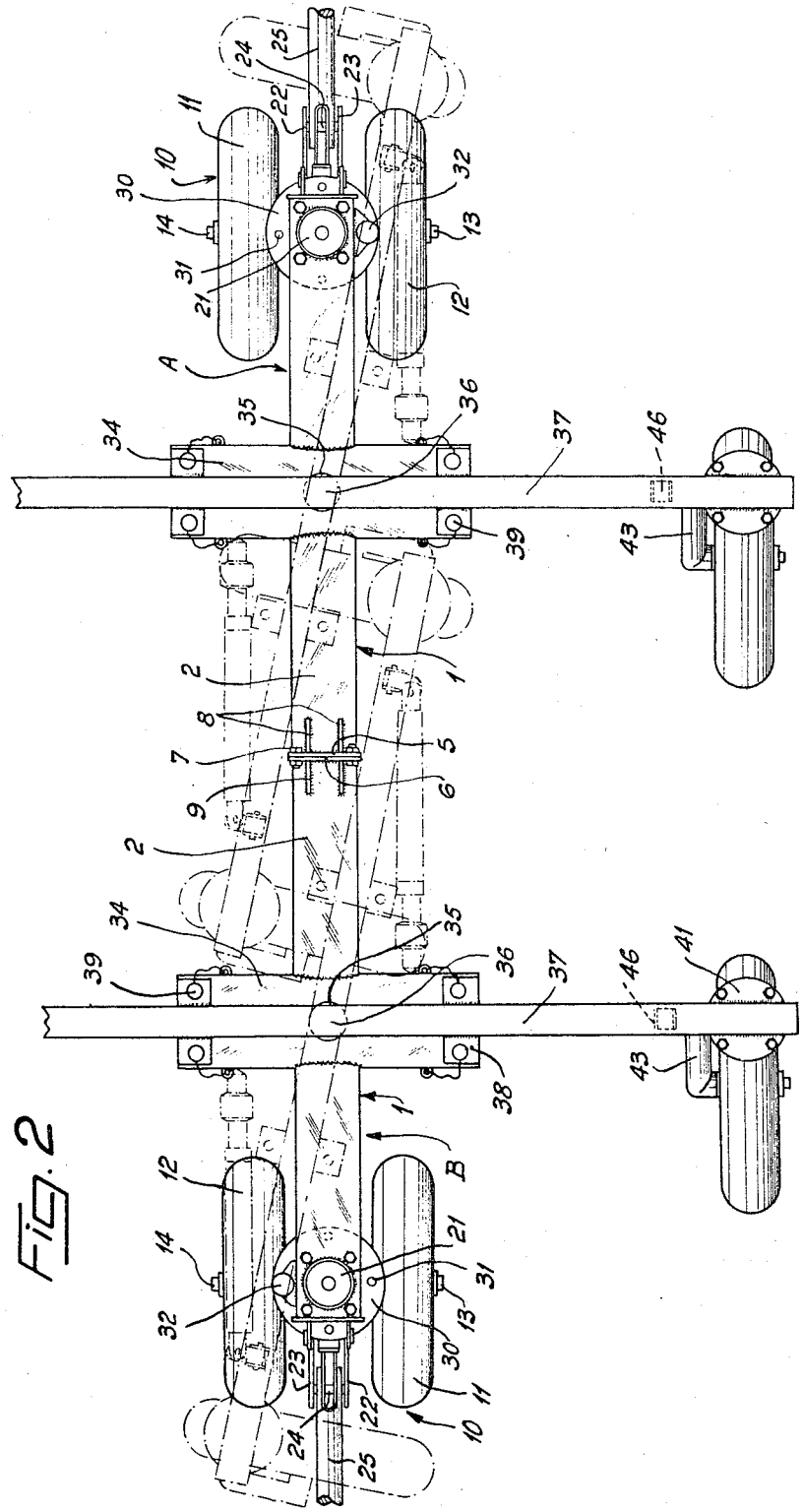
FIGURE 2 is a partial plan view on to the handling truck according to the invention, showing the folded position of the truck in dot-dash lines.
Figure 3:
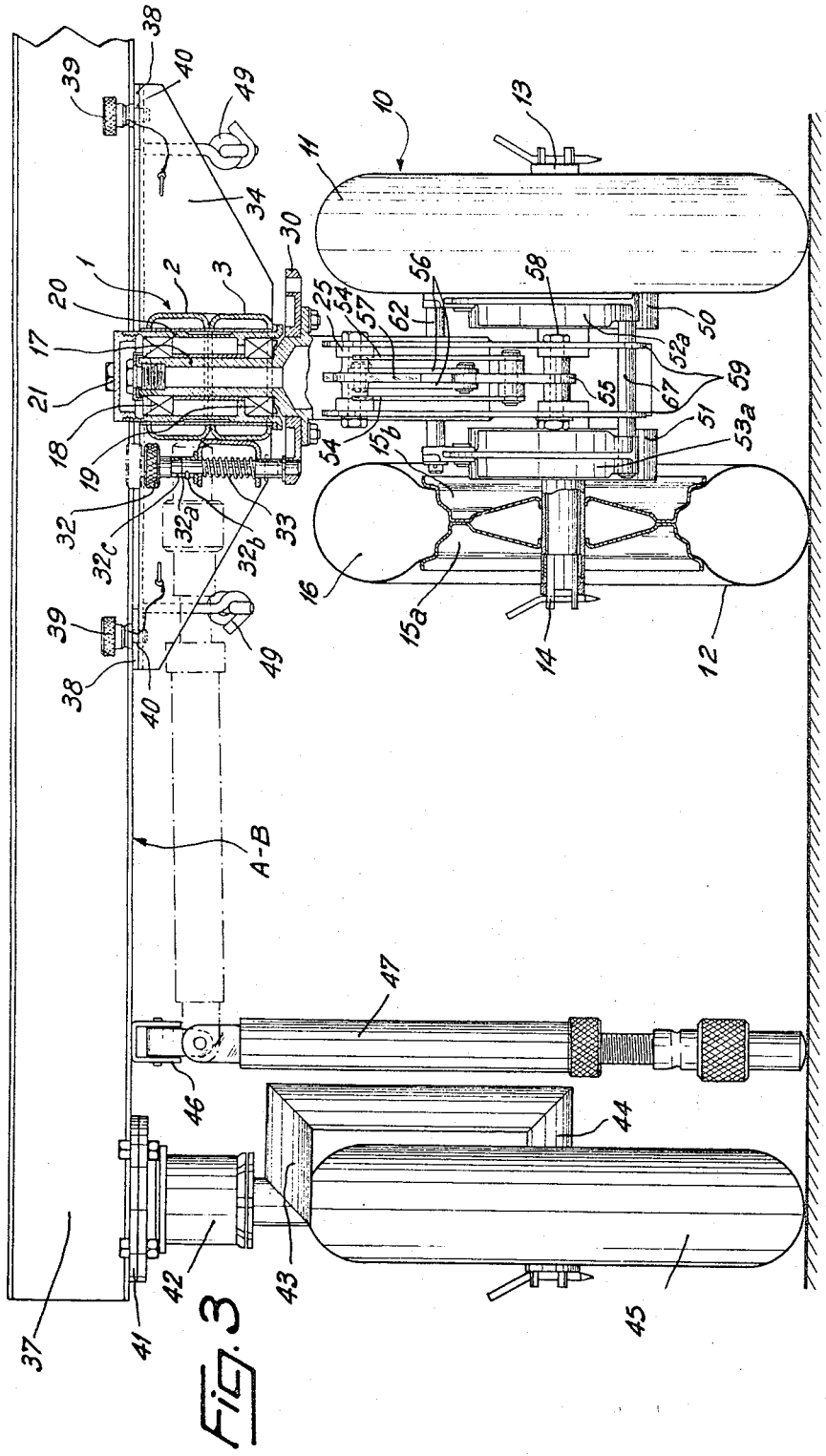
FIGURE 3 is a front view, partly broken away, of the handling truck shown in FIGURES 1a and 2.

The truck shown in FIGURES 1a, 2 and 3 comprises two identical elements A and B. Each of the elements A and B comprises a longitudinal beam 1 formed by the superposition of two identical tubular section members 2 and 3 of rectangular cross-section which are connected together by spot welds 4.

The longitudinal beams 1 terminate at one of their ends in transverse flanges 5 and 6 which are perpendicular to the longitudinal axes of the said beams and can be connected by fixing means 7 constituted by nuts and bolts, for example. Buttressing elements 8 and 9, welded to the beams 1 and fast with the flanges 5 and 6, reinforce the latter.

Selectively directable running gear units 10 are arranged at the ends of the longitudinal beams opposite from the flanges 5 and 6. These running gear units 10 comprise two independent wheels 11 and 12 which are arranged close together and are adapted to rotate about stub shafts 13 and 14 and are constituted by two bearing plates 15a and 15b welded (see FIGURE 3) together and forming a rim at their periphery, tyres 16 being mounted on these rims. As FIGURES 3 also shows, the selectively directable running gear units are fast with king-pins 17 which are journalled by means of ball bearings 18 and 19 in bearing members 20 fast with the beams 1.

Screw plugs 21 permit the upper portion of the bearing members 20 to be closed hermetically, and the said bearing members can thus be filled with grease.

Bearing plates 22 and 23, parallel to one another and perpendicular to the shafts 13, are fast with the king-pins 17 and carry a shaft 24 parallel to the shaft 13 of the corresponding running gear unit 10 and about which a tubular lever 25 can pivot. A draw bar 26 (see FIGURE 1b) comprising a control handle 27 and attachment means 28, can be fitted to the levers 25 and fixed by means of keys 29.

A flat disc 30 which is also fast with each of the king-pins 17 comprises, towards its periphery, holes 31 with which there can co-operate a locking finger 32 mobile in a sleeve 32a fixed to the beam 1 in the direction of the said disc under the action of a spring 33, provided that a stud 32b connected to the finger 32 is engaged in a slot 32c of the sleeve 32a. Thus it is possible to lock the finger 32 in the holes 31 so as to give the running gear units 10 a fixed orientation. When such locking is not desirable, the stud 32b is made to issue from the slot 32c by pulling on the finger 32 and application against the upper edge of the sleeve 32a.

Fixed on the longitudinal beams 1 are supports 34 made of folded sheet metal which are in the form of a double bracket, these comprising bores 35 through which can extend pivots 36 fast with I-section members 37.

The pivots 36 are journalled in bearings (not shown in the drawings) situated within the beams 1. Fixing tabs 38 comprising a bore are fast with the section members 37 and co-operate with rapid-fixing pins 39 and holes 40 of the support 34 to lock the section members 37 substantially perpendicularly to the longitudinal beams 1.

Each of the ends of the section members 37 is fast with flanges 41 on which are fixed bearing members 42. Journalled in these bearing members is one of the ends of offset legs 43 comprising at their other end a stub shaft 44 on which wheels 45, identical to the wheels 11 and 12, are rotatably mounted.

In the vicinity of each of the flanges 41, a double articulation 46 makes it possible to render mobile a supporting leg 47, both parallel to and perpendicular to the section member 37. These supporting legs 47 are advantageously constituted by screw jacks. Thus, whatever the weight of the article transported, the crushing of the tyres may be compensated for by means of the supporting legs 47, which permits of placing the section members 37 at the height of fixed supports, for example trestles for loading or unloading the truck. Fixing flanges 48 connected to the section members 37 also permit of connecting the truck according to the invention to the said fixed supports. During transport, the supporting legs 47 are folded along the section members 37 and held by hooks 49.

Between the closely-spaced wheels 11 and 12 there is arranged a brake device which makes it possible to prevent these wheels from rotating, when appropriate. Each stub shaft 13 and 14 is fast with a drum 50 and 51 respectively on which a pair of jaws 52a, 52b or 53a, 53b can act.

The levers 25 pivoting about the shaft 24 are connected by a lever and link system 54, 55, 56, whose elements are articulated to one another, to a cam 57 (see FIGURES 4 and 5 in which the king-pin is shown in section along its axis). The lever 55 can pivot about a pin 58, fast with the king-pin 17, by means of bearing plates 59 welded to the said king-pin. The cam 57 is also mounted to be pivotable about a pin 60 fast with the bearing plates 22.

In the normal position of use of the levers 25 for the pulling of the truck, this position being slightly inclined upwards relatively to the horizontal, a notch 61 provided in the active surface of the cam 57 presses a roller 62b carried by a pivot stud 62 of a toggle lever system 63 mobile in an aperture 62a of the king-pin 17 in opposition to the action of a spring 64 held by a collar 69.

The ends of the arms of the toggle lever system 63 are pivotably connected at 65, 66 to the jaws 52a, 52b (or 53a, 53b), these jaws themselves being mobile about pivots 67 and 68 which are fast with the bearing plates 59.

When the lever 25 is lowered, the links 54 draw upwards the lever 55 which pivots towards the right (in FIGURE 4) about the pivot 58 and repel the links 56 also towards the right. These links therefore cause the pivoting of the cam 57 from the left towards the right and the roller 62b escapes from the notch 61 and, under the action of the spring 64, rolls on the profile of the cam 57. This profile is designed so that a rotation from left to right of the said cam permits an upward movement of the stud 62 which is entrained by the spring 64.

Consequently (see FIGURE 5) the toggle lever system 63 tends to close again, and the jaws 52a and 52b engage against the drum 50.

Conversely, an upward movement of the levers 25 causes a compression of the spring 64 and, then, the drums 50 and 51 can rotate freely.

The extreme upper and lower positions of the levers 25 are determined by the extreme positions of the stud 62 in the aperture 62a.

A screwable plug 69 closes the lower end of the king-pin 17 and comprises a housing 69a for the spring 64, which makes it possible to regulate the compression of the latter.

FIGURES 6 to 9 show some examples of the use of the truck according to the invention.

When the article to be transported is of considerable length, FIGURE 7 shows that it is possible to connect the elements A and B of the truck by an extension C. It may be remarked that for this purpose it is possible to use draw bars of considerable length also.

The extension D shown in FIGURE 8 has been made extra low in order to permit the transport of bulky articles. Ropes 70 connected to tensioning members 71 can then be provided to hold these articles during transport.

FIGURE 9 shows the truck according to the invention equipped with a supporting plate E provided more especially for the transport of helicopter rotor hubs.

It will readily be apparent that it is possible on such trucks to rapidly fit a support or an extension which corresponds to the optimum extent to the dimensions of the article to be transported.

Whether the truck according to the invention is used with or without an extension, it is easy to make it follow any direction whatsoever. In fact, possibly with the help of draw bars, it is sufficient to direct the running gear units 10 in the desired direction in order to make the offset wheels direct themselves with the application of the least pulling or pushing force.

The truck can also be locked in the stopped condition by means of its brake devices. This braking is particularly useful when the truck is used for example on an aircraft carrier. These latter devices are also designed so that the rocking of the levers 25, under the effect of their own weight, causes an effective braking action.

The running gear units being equipped with tyres, preferably low-pressure tyres, make it possible to absorb ground surface irregularities without any damage to the transported article, and to ensure a good grip.

Furthermore, as shown in broken lines in FIGURE 2, it is possible to fold the truck when it is not being used, so that it need only occupy a minimum amount of space. To do this, all that has to be done is to remove the rapid-fixing pins 39 and to pivot the section members 37 to make them approach the beams 1. The levers 25 are placed below the said beams by rotating the running gear units about the king-pins 17. It then remains to lock the section members in this position, bringing the supporting legs 47 to abut on the supports 34.

I claim:

1. A handling truck comprising at each of its two ends a selectively directable running gear unit of narrow track width relatively to the width of the truck, the said running gear units being each mobile about a vertical axis and comprising two closely-spaced wheels mounted on stub shafts which are coaxial with one another, symmetrically arranged on either side of the corresponding vertical axis, and, on either side of the plane defined by the said vertical axes, a plurality of self-directing running gear units.

2. A handling truck according to claim 1, comprising at its sides elements for fixing to fixed supports, and supporting legs of adjustable height, so as to facilitate the transfer of the load being transported from these fixed supports to the truck and vice versa, each of these supporting legs being at the proximity of a self-directing running gear unit.

3. The handling truck according to claim 1, wherein the running gear units are carried at the opposite ends of frame means whose other ends are coupled by separable coupling means for the interposition of extensions of a shape appropriate to the article to be transported.

4. A handling truck according to claim 1, wherein the selectively directable running gear units comprise, for their orientation, a lever which is pivotable about an axis parallel to that of the shafts of the corresponding running gear units and connected to a brake device for these units exerting a braking action in the sense of the lowering of the lever.

5. A handling truck according to claim 1, comprising two identical elements each comprising a selectively directable running gear unit and two self-directing running gear units symmetrically arranged relatively to the first elements which are adapted to be directly connected in a plane perpendicular to the plane defined by the said vertical axes, each of the identical elements of the truck being formed by a longitudinal central beam carrying, at one of its ends, a selectively directable running gear unit and, at the other end, a connecting device, a cross-beam on the ends of which there are mounted the self-directing running gear units being carried by a pivot on the central beam, the said cross-beam being adapted to be immobilised in two positions relatively to the said beam, namely a transverse position and a folded position.

References Cited

UNITED STATES PATENTS

| | | | |
|---|---|---|---|
| 1,091,516 | 3/1914 | Johnson | 280—40 X |
| 1,552,644 | 9/1925 | Perin | 214—38 |
| 1,763,535 | 6/1930 | Nuttall | 280—150 X |
| 2,253,791 | 8/1941 | Kline et al. | 280—408 |
| 2,453,575 | 11/1948 | House | 188—119 |
| 2,685,351 | 8/1954 | Kramcsak | 188—119 |
| 2,929,524 | 3/1960 | Carlson et al. | 280—150 X |
| 2,964,894 | 12/1960 | Culver | 214—38 X |

FOREIGN PATENTS

| | | |
|---|---|---|
| 660,099 | 3/1963 | Canada. |
| 1,118,073 | 3/1956 | France. |
| 541,705 | 4/1956 | Italy. |

LEO FRIAGLIA, *Primary Examiner.*